US006090464A

United States Patent [19]

Yoo

[11] Patent Number: 6,090,464
[45] Date of Patent: Jul. 18, 2000

[54] REINFORCED SUBSTRATE AND FLAT PANEL DISPLAY EMPLOYING THE SAME

[75] Inventor: Min-sun Yoo, Suwon, Rep. of Korea

[73] Assignee: Samsung Display Devices Co., Ltd., Kyungki-Do, Rep. of Korea

[21] Appl. No.: 09/070,740

[22] Filed: May 1, 1998

[30] Foreign Application Priority Data

Dec. 10, 1997 [KR] Rep. of Korea ...................... 97-67423

[51] Int. Cl.[7] ................................ B32B 3/12; G09G 3/22

[52] U.S. Cl. ............................ 428/73; 428/116; 428/118; 428/119; 345/60; 345/76; 345/87

[58] Field of Search .................................... 428/116, 118, 428/73, 119; 345/60, 76, 87

[56] References Cited

U.S. PATENT DOCUMENTS 3,103,460 9/1963 Picket .
3,137,602 6/1964 Lincoln .
4,724,010 2/1988 Okaniwa et al. .
4,803,108 2/1989 Leuchten et al. .
5,524,381 6/1996 Chahroudi .
5,796,854 8/1998 Markow .
5,831,374 11/1998 Morita et al. .

*Primary Examiner*—Deborah Jones
*Assistant Examiner*—Jason Savage
*Attorney, Agent, or Firm*—Leydig, Voit & Mayer

[57] ABSTRACT

A reinforced substrate for use in at least one of two substrates forming a flat panel display together with a display generating material filled between the two substrates, has a reinforcing structure for preventing bending of a substrate installed on one surface of the substrate. According to one embodiment, the reinforcing structure includes an array of hollow polygonal pillars formed of transparent glass or plastic. According to another embodiment, the reinforcing structure is made of transparent glass or plastic, and further includes an electrically conductive film which is coated on one end surface of the hollow polygonal pillars and is then grounded to block electromagnetic waves generated inside the flat panel display. According to a still another embodiment, the reinforcing structure is made of conductive metal, and one end of the array of hollow polygonal pillars is grounded to block electromagnetic waves generated inside the flat panel display.

20 Claims, 4 Drawing Sheets

REINFORCED SUBSTRATE AND FLAT PANEL DISPLAY EMPLOYING THE SAME

BACKGROUND OF THE INVENTION

1. Field of the Invention

The present invention relates to a reinforced substrate for a flat panel display and a flat panel display using the same, and more particularly, to a reinforced substrate and an improved flat panel display which can prevent deformation of a substrate without increasing the thickness of the substrate when a flat panel display is large.

2. Description of the Related Art

In general, a flat panel display for displaying pictures can be a liquid crystal display, a plasma display panel, an electroluminescence element, etc. A flat panel display consumes significantly less power than other devices, can be produced in various sizes ranging from subminiature to a large size, and can have diverse display patterns. Therefore, flat panel displays occupy an important position in the field of display devices.

A conventional flat panel display has upper and lower substrates at least one of which is made of a transparent material such as glass or plastic to allow light to penetrate, and has the shape of a flat plate in order to have uniform refractive properties.

Such a conventional flat panel display must have an enlarged substrate to provide a large display area (e.g., 40 inches or more in one direction). As the area of the substrate increases, its thickness must be also increased in order to maintain the flatness of the substrate. A thick substrate impedes manufacture of a flat panel display because of its weight, reduces transmissivity of display light, and increases manufacturing costs.

SUMMARY OF THE INVENTION

To solve the above problems, it is an object of the present invention to provide a reinforced substrate for a flat panel display, having a reinforcing structure formed on one surface of the substrate, for preventing bending of the substrate.

It is another object of the present invention to provide a flat panel display having two substrates and a display generating material interposed between the two substrates under a sealed condition, in which at least one of the substrates is equipped with a reinforcing structure on one surface thereof for preventing bending of the substrate.

To accomplish the above objects, there is provided a reinforced substrate for a flat panel display, comprising a substrate and a reinforcing structure formed on one surface of the substrate for preventing bending of the substrate.

There is also provided a flat panel display comprising two substrates, a display generating material interposed between the two substrates under a sealed condition, and a reinforcing structure on one surface of at least one of the substrates for preventing bending of the substrate.

Preferably, the reinforcing structure comprises an array of hollow polygonal pillars or cylinders. In one form of the invention, the array is made of transparent glass or plastic. In another form of the invention, the array is made of an electrically conductive material. The array is preferably grounded. The reinforcing structure may further include an electrically conductive film which is coated on one end surface of the array.

The side of the reinforcing structure which does not contact the substrate may have a transparent protective member formed thereon.

BRIEF DESCRIPTION OF THE DRAWINGS

The above objects and advantages of the present invention will become more apparent from the following detailed description of preferred embodiments thereof with reference to the attached drawings in which.

DESCRIPTION OF THE PREFERRED EMBODIMENTS

Figure 1A:
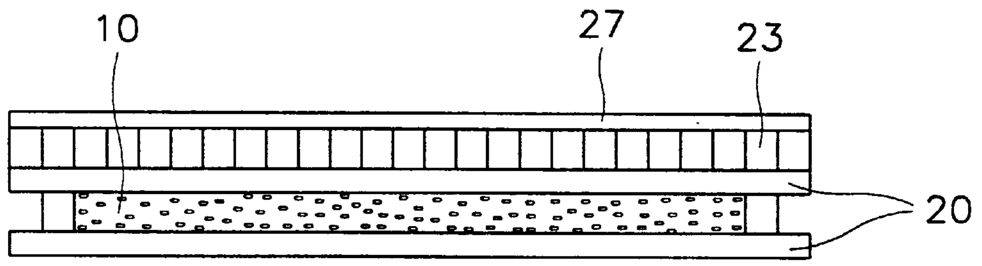
FIGS. 1A and 1B are cross-sectional views of a flat panel display to which a reinforced substrate according to the present invention is applied, the flat panel display of FIG. 1A having a single reinforced substrate and the flat panel display of FIG. 1B having two reinforced substrates.
Figure 1B:
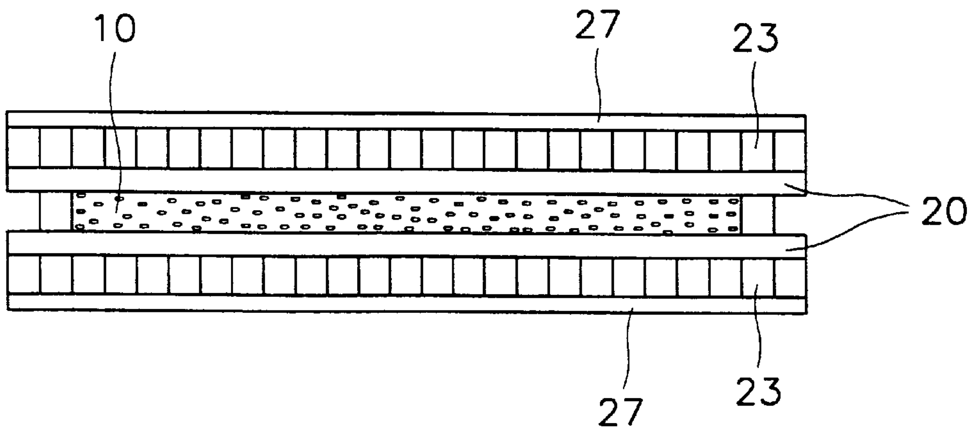

FIGS. 1A and 1B are cross-sectional views showing a flat panel display employing a reinforcing structure associated with at least one of two substrates, according to the present invention.

As shown in FIGS. 1A and 1B, the flat panel display has a reinforcing structure 23 associated with at least one of two substrates 20 installed on both sides of a display generating portion 10 filled with a display material. The display generating portion 10 may be of any type appropriate for the type of visual display which the flat panel display is intended to generate. For example, it may be a liquid crystal display, a plasma display panel or an electroluminescence element. A reinforcing structure 23 is installed on the outer surface of one or both substrates 20. The flat panel display of FIG. 1A has a reinforcing structure 23 installed on only one of its two substrates 20, while the flat panel display of FIG. 1B has a reinforcing structure 23 installed on each of its two substrates 20. The reinforcing structure 23 according to one form of the invention is an array of hollow polygonal pillars or hollow cylinders made of transparent glass or plastic. An electrically conductive film can be coated on one end surface (upper surface) of the array of hollow polygonal pillars or hollow cylinders and be grounded. Alternatively, when the reinforcing structure 23 is made of an electrically conductive material, the hollow polygonal pillars or hollow cylinders can be grounded. A protective member 27 is installed on the upper portion (one end surface) of the reinforcing structure 23. The protective member 27 prevents the inside of the reinforcing structure 23 from collecting contaminants such as dust and protects it from damage. The protective member 27 is preferably made of a light, tough and transparent material, such as plastic.

Figure 2:
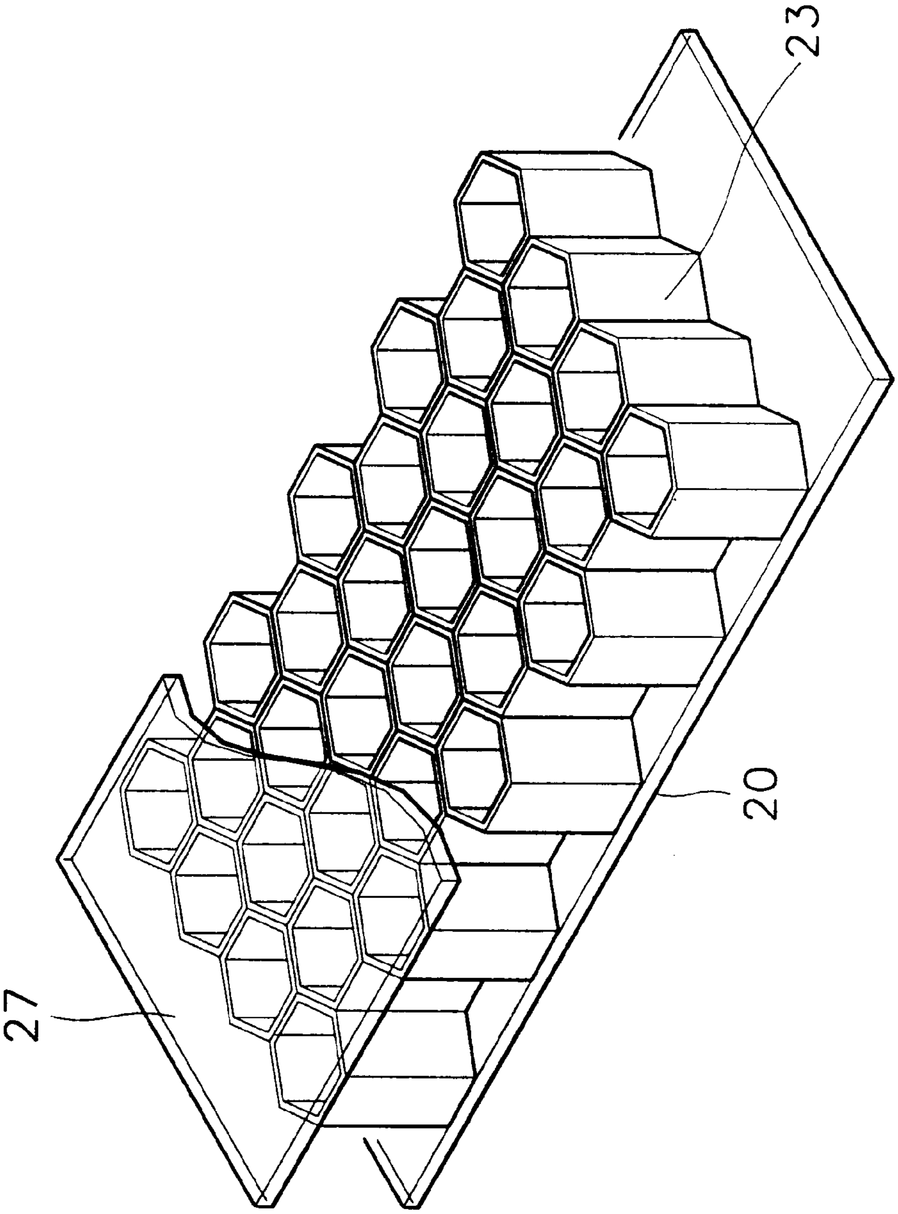
FIG. 2 is a perspective view illustrating a reinforced substrate for a flat panel display according to a first embodiment of the present invention.

FIG. 2 shows a reinforced substrate according to a first embodiment of the present invention. Referring to FIG. 2, a reinforced substrate has a substrate and a reinforcing structure 23 attached to the substrate 20 for reinforcing the substrate 20. Such a reinforcing structure can be installed on one surface of one or both substrates in a flat panel display. The reinforcing structure 23 is made of a transparent, electrically nonconductive material, such as glass or plastic, and is formed of an array of hollow hexagonal pillars or hollow cylinders. It is preferable that the area of one hexagonal pillar or cylinder corresponds to the area occupied by at least 10 pixels of the flat panel display. The reinforcing structure 23 preferably has a protective member 27 made of a light, tough and transparent material, such as plastic, in order to prevent the inside of the reinforcing structure 23 from collecting contaminants such as dust and to protect it from damage. The protective member 27 is attached to the side of the reinforcing structure 23 which does not contact the substrate 20.

Figure 3:
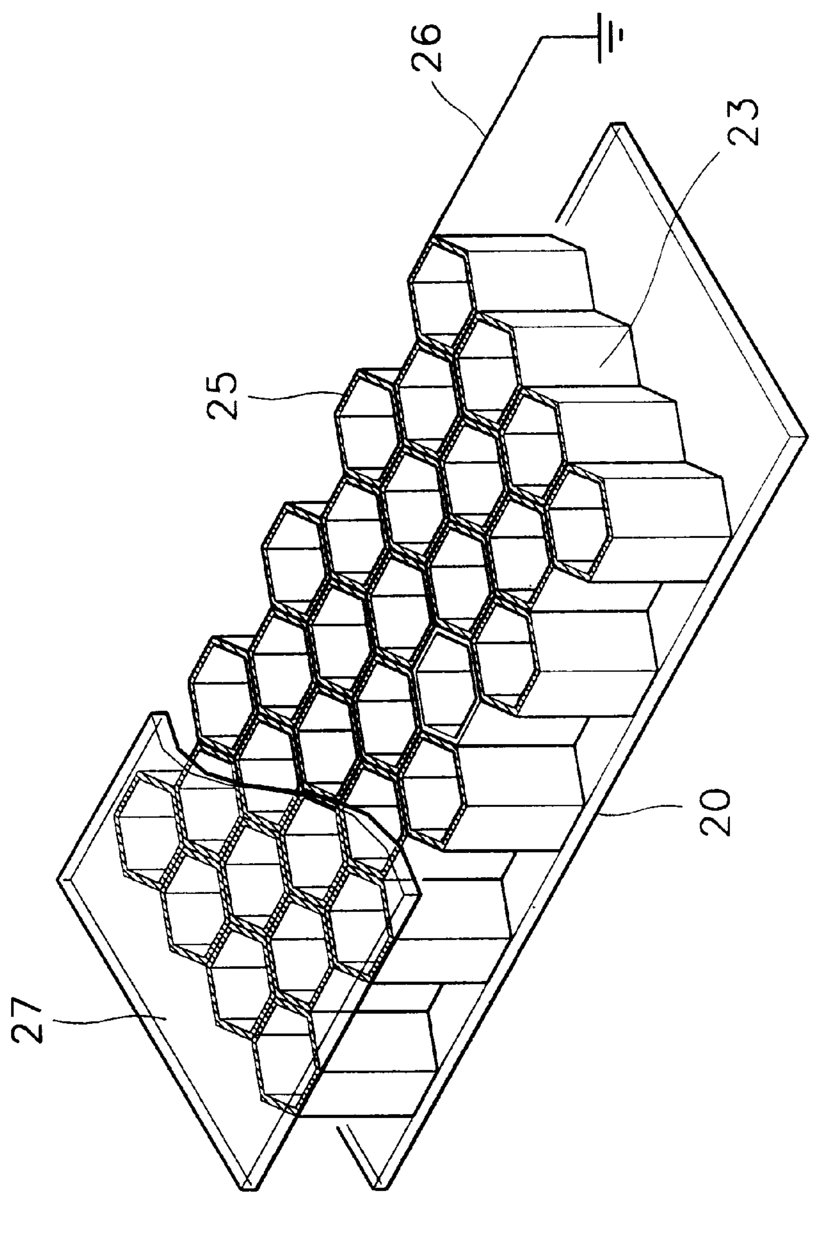
FIG. 3 is a perspective view illustrating a reinforced substrate for a flat panel display according to a second embodiment of the present invention.

FIG. 3 is a perspective view illustrating a reinforced substrate for a flat panel display according to a second embodiment of the present invention.

Referring to FIG. 3, a reinforced substrate has a substrate 20 and a reinforcing structure 23 attached to the substrate 20 for reinforcing the substrate 20, and an electrically conductive film 25 coated on one end surface (the upper surface) of the reinforcing structure 23. Such a reinforcing structure can be installed on one surface of one or both substrates in a flat panel display. The reinforcing structure 23 is made of a transparent, electrically nonconductive material, such as glass or plastic, and is formed of an array of hollow hexagonal pillars or hollow cylinders. The electrically conductive film 25 is coated on the end surface of the reinforcing structure 23 which does not contact the substrate 20, and the reinforcing structure 23 coated with the conductive film 25 is grounded via a ground unit 26, such that electromagnetic waves generated within the flat panel display are blocked. The reinforcing structure 23 preferably has a protective member 27 made of a light, tough and transparent material, such as plastic, in order to prevent the inside of the reinforcing structure 23 from collecting contaminants such as dust and to protect it from damage. The protective member 27 is attached on the conductive film 25.

Figure 4:
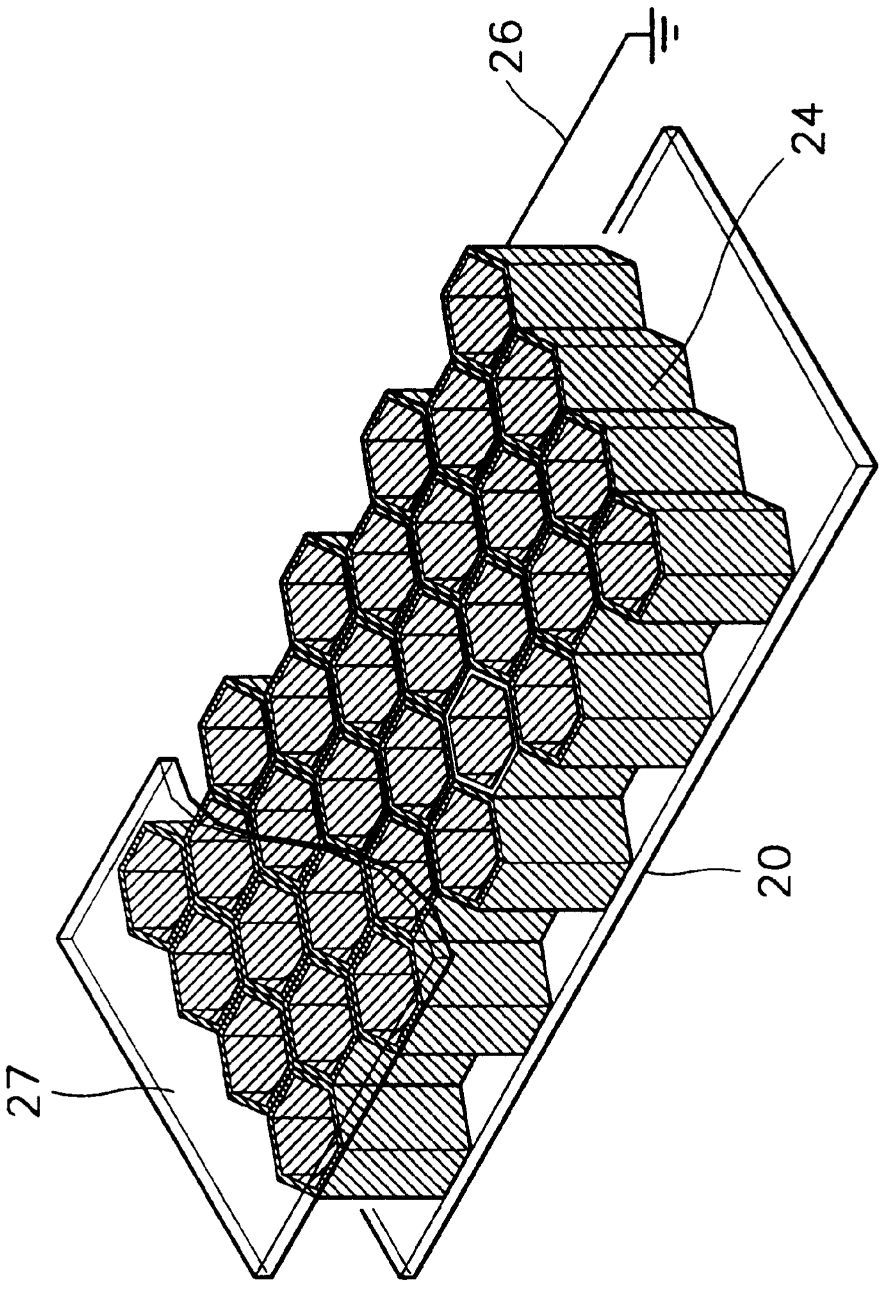
FIG. 4 is a perspective view illustrating a reinforced substrate for a flat panel display according to a third embodiment of the present invention.

FIG. 4 is a perspective view illustrating a reinforced substrate for a flat panel display according to a third embodiment of the present invention.

Referring to FIG. 4, a reinforced substrate has a substrate 20 and a reinforcing structure 24 attached to the substrate 20, which is made of electrically conductive metal and formed of an array of hollow hexagonal pillars or hollow cylinders. Thus, the reinforcing structure 24 is grounded via a ground unit 26, such that electromagnetic waves generated within the flat panel display are blocked. The material of the reinforcing structure 24 preferably has a high electrical conductivity. Such a reinforcing structure can be installed on one surface of one or both substrates in a flat panel display. The reinforcing structure 24 preferably has a protective member 27 made of a light, tough and transparent material, in order to prevent the inside of the reinforcing structure 24 from collecting contaminants such as dust and to protect it from damage. The protective member 27 is attached to one end surface (the upper surface) of the reinforcing structure 24 which does not contact the substrate 20.

As described above, when a flat panel display is manufactured in a large size, its flatness can be maintained simply by using one or two reinforced substrates according to the present invention which includes a reinforcing structure attached to one surface of the substrate, without increasing the thickness of the substrate. Since the large flat panel display uses a reinforced thin substrate rather than a thick substrate as in the prior art, more light is transmitted through the thin substrate. Also, the manufacturing cost of the substrate can be cut down, since the thickness of the substrate does not change. Furthermore, since a ground unit can be attached to the reinforcing structure, the flat panel display can block electromagnetic waves generated from its inside.

What is claimed is:

1. A reinforced substrate for use as at least one of two substrates of a flat panel display for displaying pictures, the reinforced substrate comprising:

a substrate having an internal surface for facing another substrate of a flat panel display and an external surface opposite the internal surface; and a reinforcing structure attached to and extending across the external surface of the substrate.

2. The reinforced substrate as claimed in claim 1, wherein the reinforcing structure comprises an array of hollow polygonal pillars of transparent glass or plastic.

3. The reinforced substrate as claimed in claim 2, wherein the reinforcing structure further comprises an electrically conductive film coating one end surface of the array of hollow polygonal pillars and grounded.

4. The reinforced substrate as claimed in claim 1, wherein the reinforcing structure comprises an array of hollow polygonal pillars of an electrically conductive material which is grounded.

5. The reinforced substrate as claimed in claim 1, wherein the reinforcing structure comprises an array of hollow cylinders of transparent glass or plastic.

6. The reinforced substrate as claimed in claim 5, wherein the reinforcing structure further comprises an electrically conductive film coating one end surface of the array of hollow cylinders and grounded.

7. The reinforced substrate as claimed in claim 1, wherein the reinforcing structure comprises an array of hollow cylinders of an electrically conductive material which is grounded.

8. The reinforced substrate as claimed in claim 1, including a transparent protective film is on one end surface of the reinforcing structure.

9. The reinforced substrate as claimed in claim 1, wherein the reinforcing structure comprises an array of hollow polygonal pillars.

10. The reinforced substrate as claimed in claim 1, wherein the reinforcing structure comprises an array of hollow cylinders.

11. A flat panel display for displaying pictures, the flat panel display comprising:

two substrates opposite each other, each substrate having an internal surface and an external surface, the internal surfaces of the two substrates facing each other;

a display generating portion interposed between the two substrates and sealed, located opposite the internal surfaces of the two substrates; and a reinforcing structure attached to and extending across the external surface of one of the substrates.

12. The flat panel display as claimed in claim 11, wherein the reinforcing structure comprises an array of hollow polygonal pillars of transparent glass or plastic.

13. The flat panel display as claimed in claim 12, wherein the reinforcing structure further comprises an electrically conductive film coating one end surface of the array of hollow polygonal pillars and grounded.

14. The flat panel display as claimed in claim 11, wherein the reinforcing structure comprises an array of hollow polygonal pillars formed of an electrically conductive material which is grounded.

15. The flat panel display as claimed in claim 11, wherein the reinforcing structure comprises an array of hollow cylinders of transparent glass or plastic.

16. The flat panel display as claimed in claim 15, wherein the reinforcing structure further comprises an electrically conductive film coating one end surface of the array of hollow cylinders and grounded.

17. The flat panel display as claimed in claim 11, wherein the reinforcing structure comprises an array of hollow cylinders of an electrically conductive material which is grounded.

18. The flat panel display as claimed in claim 11, wherein the reinforcing structure comprises an array of hollow polygonal pillars.

19. The flat panel display as claimed in claim 11, wherein the reinforcing structure comprises an array of hollow cylinders.

20. The flat panel display as claimed in claim 11, including a transparent protective film is formed on one end surface of the reinforcing structure.

* * * * *